(12) United States Patent
De Masi et al.

(10) Patent No.: US 10,769,449 B2
(45) Date of Patent: Sep. 8, 2020

(54) DYNAMIC METHOD AND SYSTEM FOR MONITORING AN ENVIRONMENT

(71) Applicant: RECO3.26 S.R.L., Castromediano Cavallino (IT)

(72) Inventors: Ivano Tommaso Ippazio De Masi, Casarano (IT); Bruno Scalpello, Lecce (IT)

(73) Assignee: RECO3.26 S.R.L., Cavallino (IT)

( * ) Notice: Subject to any disclaimer, the term of this patent is extended or adjusted under 35 U.S.C. 154(b) by 62 days.

(21) Appl. No.: 16/306,417

(22) PCT Filed: Jun. 8, 2017

(86) PCT No.: PCT/IB2017/053382
§ 371 (c)(1),
(2) Date: Nov. 30, 2018

(87) PCT Pub. No.: WO2017/212430
PCT Pub. Date: Dec. 14, 2017

(65) Prior Publication Data
US 2019/0171888 A1 Jun. 6, 2019

(30) Foreign Application Priority Data

Jun. 10, 2016 (IT) ........................ 102016000059682

(51) Int. Cl.
*G06K 9/32* (2006.01)
*G06K 9/00* (2006.01)
*G08B 21/18* (2006.01)

(52) U.S. Cl.
CPC ..... *G06K 9/00771* (2013.01); *G06K 9/00288* (2013.01); *G06K 9/00979* (2013.01);
(Continued)

(58) Field of Classification Search
CPC combination set(s) only.
See application file for complete search history.

(56) References Cited

U.S. PATENT DOCUMENTS 6,028,626 A * 2/2000 Aviv ................. G06K 9/00771
348/152
6,731,805 B2 * 5/2004 Brodsky ............ G06K 9/00771
348/143

(Continued)

OTHER PUBLICATIONS

Dziengel, N., et al. "Deployment and evaluation of a fully applicable distributed event detection system in Wireless Sensor Networks", *AD Hoc Networks* 37, 150-182, (Sep. 2015). 23 pages.
(Continued)

*Primary Examiner* — Tsung Yin Tsai
(74) *Attorney, Agent, or Firm* — Steinfl + Bruno LLP

(57) ABSTRACT

Dynamic methods and systems for monitoring an environment. The methods and systems adopt functional nodes with at least one context node and one or more application nodes. The application nodes include at least one of a processing application node, a notifying application node, and/or an action application node. Input data of the environment are analyzed and detected. Representative data are extracted and compared with a group of comparative data by calculating a deviation between the representative data and the most similar comparative data. The notifying application node may send an alarm as a function of the deviation detected as above. An environment monitoring network is formed as a function of the functional nodes. The environment monitoring network is topologically variable as a function of i) the environment to be monitored, ii) the functions of the functional nodes and iii) the deviation detected. Monitoring occurs as a function of the topology of the implemented environment monitoring network.

18 Claims, 9 Drawing Sheets

| Node | Tasks | Definition and Categorisation |
|---|---|---|
| 1 | a,b,c,f | Context node - dedicated to acquisition of the face to be recognised (a), analysis of the scene (b), extraction of the Features (c) and to directing the notifications on the basis of the evaluation of the search results (f) |
| 2 | d,e | Node dedicated to processing the search for similar patterns to the extracted pattern |
| 3 | g | Node for receiving notifications and management of alarms |

Develops an architecture with Distributed Application Logic as the business logic is shared between nodes 2 and 3

(52) U.S. Cl.
CPC ......... *G06K 9/3258* (2013.01); *G08B 21/182* (2013.01); *G06K 2009/00738* (2013.01); *G06K 2209/15* (2013.01)

(56) References Cited

U.S. PATENT DOCUMENTS

| | | | | |
|---|---|---|---|---|
| 6,754,367 | B1* | 6/2004 | Ito | G06K 9/00771 348/154 |
| 7,149,325 | B2* | 12/2006 | Pavlidis | G06F 3/005 382/103 |
| 2005/0163345 | A1* | 7/2005 | van den Bergen | G06K 9/00771 382/103 |
| 2005/0163346 | A1* | 7/2005 | van den Bergen | G06K 9/00771 382/103 |
| 2007/0279494 | A1* | 12/2007 | Aman | H04N 5/262 348/169 |
| 2008/0258880 | A1 | 10/2008 | Smith et al. | |
| 2009/0276705 | A1* | 11/2009 | Ozdemir | G06K 9/00771 715/708 |
| 2011/0052068 | A1* | 3/2011 | Cobb | G06K 9/00771 382/190 |
| 2013/0305357 | A1* | 11/2013 | Ayyagari | G06F 9/00 726/22 |
| 2014/0003710 | A1* | 1/2014 | Seow | G06K 9/00771 382/159 |
| 2016/0110972 | A1 | 4/2016 | Renkis | |

OTHER PUBLICATIONS

International Search Report for International Application No. PCT/IB2017/053382 filed Jun. 8, 2017 on behalf of Ivano Tommaso Ippazio De Masi. dated Sep. 19, 2017. 3 pages.

Written Opinion for International Application No. PCT/IB2017/053382 filed Jun. 8, 2017 on behalf of Ivano Tommaso Ippazio De Masi. dated Sep. 19, 2017. 11 pages.

* cited by examiner

Fig. 4

| Node | Tasks | Definition and Categorisation |
|---|---|---|
| 1 | a,f | Context node - dedicated to acquisition of the face to be recognised (a), and to directing the notifications on the basis of the evaluation of the search results (f) |
| 2 | b,c,d,e | Node dedicated to processing the business logic dedicated to the extraction of the Features, to the search for the pattern and evaluation of a "distance" between the acquired pattern and the most similar pattern |
| 3 | g | Node for receiving notifications and management of alarms |

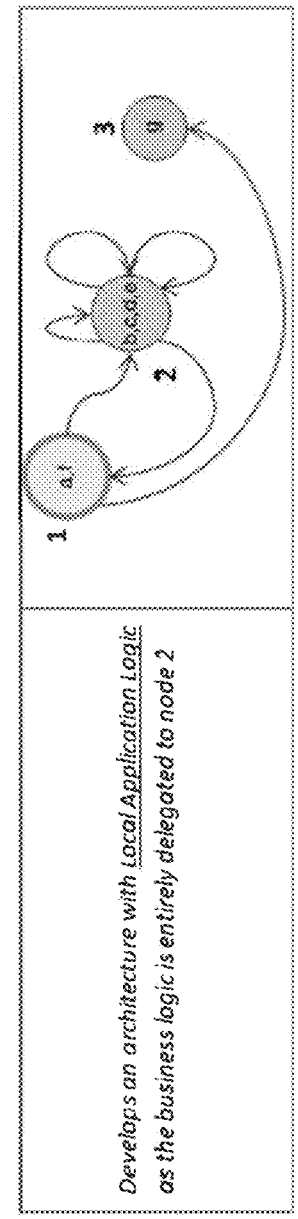

Develops an architecture with *Local Application Logic* as the business logic is entirely delegated to node 2

| Node | Tasks | Definition and Categorisation |
|---|---|---|
| 1 | a,b,c,f | Context node - dedicated to acquisition of the face to be recognised (a), analysis of the scene (b), extraction of the Features (c) and to directing the notifications on the basis of the evaluation of the search results (f) |
| 2 | d,e | Node dedicated to processing the search for similar patterns to the extracted pattern |
| 3 | g | Node for receiving notifications and management of alarms |

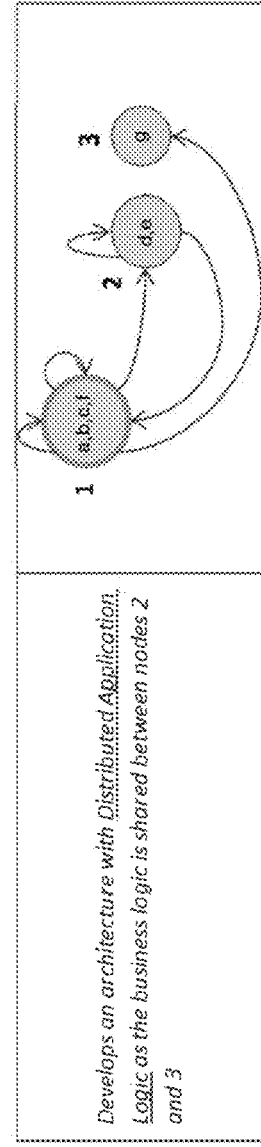

Develops an architecture with *Distributed Application Logic* as the business logic is shared between nodes 2 and 3

Fig. 7

| Node | Tasks | Definition and Categorisation |
|---|---|---|
| 1 | a | Context node - Input |
| 2 | b, c, d, e, f | Node with application logic dedicated to the extraction of the Features, to the search for the pattern and evaluation of a "distance" between the acquired pattern and the most similar pattern, for processing data and directing notifications |
| 3 | g | Node for receiving notifications and management of alarms |

Fig.9

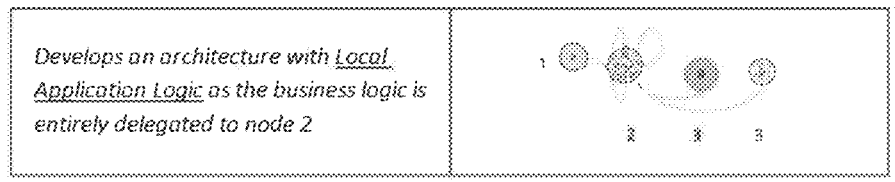

| Develops an architecture with Local Application Logic as the business logic is entirely delegated to node 2 | |

Fig.10

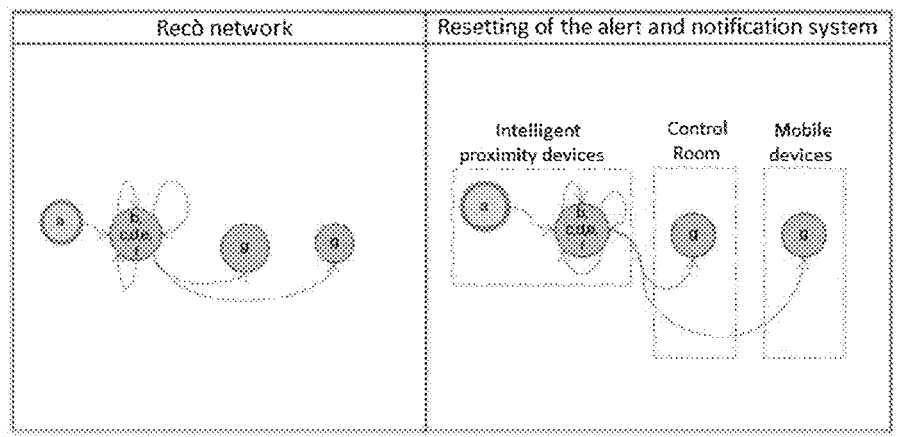

Fig.11

| Node | Tasks | Definition and Categorisation |
|---|---|---|
| 1 | a | Context node - Input |
| 2 | b,c,d,e | Node with application logic dedicated to the extraction of the Features, to the search for the pattern and evaluation of a "distance" between the collected pattern and the most similar pattern |
| 3 | f | Node for processing data and directing notifications |
| 4 | g | Node for receiving notifications and management of alarms |

Fig.12

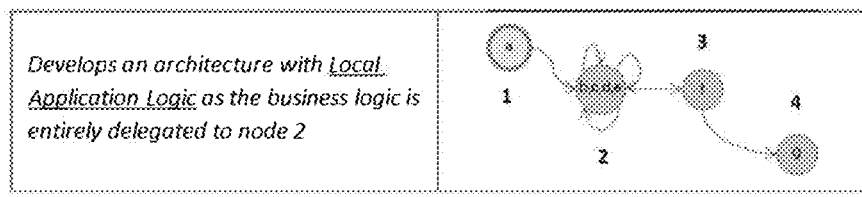

*Develops an architecture with Local Application Logic as the business logic is entirely delegated to node 2*

Fig.13

| Node | Tasks | Definition and Categorisation |
|---|---|---|
| 1 | a | Context node - Input |
| 2 | b,c,d | Node with application logic dedicated to the extraction of the Features |
| 3 | e | Node for processing the extracted pattern and searching for similar patterns - Server |
| 4 | f | Node for processing data and directing notifications |
| 5 | g | Node for receiving notifications and management of alarms |

Fig.14

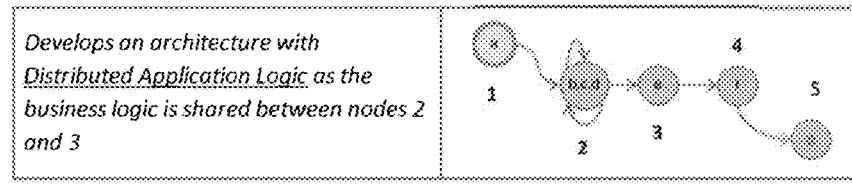

*Develops an architecture with Distributed Application Logic as the business logic is shared between nodes 2 and 3*

Fig.15

| Node | Tasks | Definition and Categorisation |
|------|-------|-------------------------------|
| 1 | a | Context node - Input |
| 2 | b,d,e | Node with application logic dedicated to detection and tracking the scene |
| 3 | f | Node for processing data and directing notifications - Server |
| 4 | g | Node for receiving notifications and management of alarms |
Fig.16
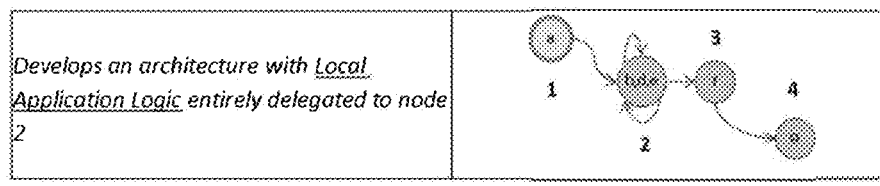
Fig.17
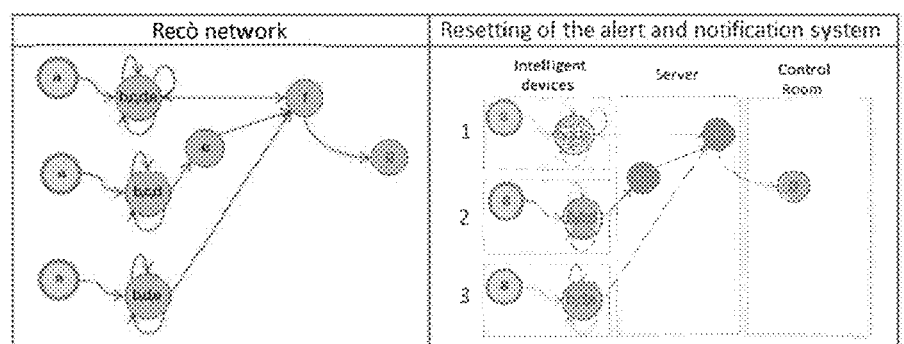
Fig.18

DYNAMIC METHOD AND SYSTEM FOR MONITORING AN ENVIRONMENT

CROSS REFERENCE TO RELATED APPLICATIONS

The present application is the US national stage of International Patent Application PCT/IB2017/053382 filed on Jun. 8, 2017 which, in turn, claims priority to Italian application 102016000059682 filed on Jun. 10, 2016.

FIELD OF APPLICATION

The object of the present invention is a dynamic monitoring system/method of an environment.

In particular, the invention relates to a dynamic monitoring system/method of conditions representing an environment.

In particular, the invention relates to a dynamic monitoring system/method of critical conditions in an environment.

PRIOR ART

Environment monitoring systems are known on the market, from monitoring systems of critical infrastructures to access control systems, that is video management systems of pluralities of tv cameras, prison security systems, schools, banks, casinos, government corporations, hospitals, airports, shopping centres, data centres, image detecting systems for external environments, image detecting systems, in particular for recognition of number plates or vehicles, security systems for transport, communications, data protection and for production and distribution plants, for example of energy and for protection of the territory.

The wide range of products available on the market has a unifying, but equally penalising, feature: inflexibility.

In other words, all the cited systems are predisposed for a functioning with a predefined and not flexible structure on which the security and reliability of the system is imposed.

In operating conditions that cannot be fitted to this rigid structure, the systems will not function or, worse, will seem to function but do not guarantee the security conditions necessary and for which they are being used.

Consequently, in the best-case scenario, in non-standard functioning cases, the prior art does not provide solutions, or in the worst case, provides solutions that are not in reality usable or are inefficient.

Often the prior art systems are built for situations/conditions that are also critical for security and safety of persons, as well as things, and this indeterminate nature is not acceptable.

An aim of the present invention is to realise a dynamic monitoring system of an environment able to efficiently detect conditions in an environment independently of a specific functional structure of the system itself.

A further aim of the present invention is to define a corresponding dynamic monitoring method of an environment that is able to efficiently detect conditions in an environment.

A further aim of the present invention is to define a dynamic monitoring method of an environment that is able to efficiently detect critical conditions in an environment.

SUMMARY OF THE INVENTION

In a first aspect of the invention, these and other aims are attained by a dynamic monitoring method of an environment comprising steps of: predisposing a plurality of functional nodes comprising:

at least a context node configured for interfacing with the environment to be monitored;
one or more application nodes comprising one or more from among
  a processing application node configured for processing data of said environment to be monitored;
  a notifying application node configured for notifying alarm situations of said environment to be monitored to further application nodes;
  an action application node configured for sorting alarms to a control room.

Wherein the method further comprises steps of:
  (a) detecting input data of said environment representative of a significant event in said environment;
  (b) analysing said input data of the environment;
  (c) extracting representative data of the significant event as a function of the input data;
  (d) comparing said representative data with a group of comparative data;
  (e) calculating a deviation between the representative data and the most similar of said comparative data;
  wherein the steps (b) (c) (d) and (e) are carried out by one from among said context node or one or more from among the application nodes;
  (f) notifying via the notification node of an alarm as a function of the deviation detected;
  realising a monitoring network of the environment as a function of said plurality of functional nodes;
  wherein the monitoring network of the environment is topologically variable as a function of the environment to be monitored, of the functions of the functional nodes and the deviation detected; in other words, the monitoring network of the environment is configured for varying, as a function of the environment to be monitored, the functions of the functional nodes and the deviation detected;
  and wherein the monitoring of the environment is realised as a function of the topology of the monitoring network implemented.

The first aspect is described in independent claim 1.

Advantageous aspects are included in dependent claims from 2 to 12.

In an embodiment, the method is actuated by a calculator, as described in claim 10.

In a second aspect of the invention, these and other aims are attained by a dynamic monitoring system of an environment comprising:
  a context node configured for interfacing with the environment to be monitored;
  one or more application nodes comprising one or more from among:
    a processing application node configured for processing data of the environment to be monitored;
    a notifying application node configured for notifying alarm situations of said environment to be monitored to further application nodes;
    an action application node configured for sorting alarms to a control room;
    a processing unit configured for managing the monitoring of the environment among the functional nodes, in which the processing unit comprises:
    a detecting module configured for (a) detecting input data of the environment representative of a significant event in the environment;
    an analysing module configured for (b) analysing said input data of said environment;

an extraction module configured for (c) extracting representative data of the significant event as a function of the input data;

a comparing module configured for (d) comparing said representative data with a group of comparative data;

a deviation module configured for (e) calculating a deviation between said representative data and the most similar said comparative data;

a notifying module configured for (f) notifying via the notification node an alarm as a function of the deviation detected;

wherein said modules configured for carrying out steps (b) (c) (d) (e) (f) are carried out by one from among the context node or one or more from among the application nodes, implementing a monitoring network of the environment;

wherein the monitoring network of the environment is topologically variable as a function of the environment to be monitored, of the functions of the functional nodes and the deviation detected; in other words, the monitoring network of the environment is configured for varying, as a function of the environment to be monitored, the functions of the functional nodes and the deviation detected;

and wherein the processing unit is configured for managing the monitoring of the environment as a function of the topology of the monitoring network. The second aspect is described in independent claims 13.

Advantageous aspects are included in the dependent claims from 14 to 16.

In a third aspect of the invention, these and other aims are attained by an environment to be monitored, comprising:

sending means of data to be monitored, configured for sending input data of the environment representing a significant event in the environment;

a dynamic monitoring system according to what is described in the second aspect of the invention, wherein said detecting module is configured for detecting said input data.

The third aspect is described in independent claim 17.

In general, the invention is based on the technical effects of a flexibility and ductility of the monitoring, an applicability of the detection to different conditions/environments and an efficiency of the detection, in particular in critical conditions.

In other words, the invention enables:

efficient recognition, notification and management of states of alert, in particular depending on critical situations in an environment;

high scalability of the operations and the detecting structure;

high precision in the conditions detected, and in particular in the images detected.

The application sectors are multiple and based on the characteristics of the detecting means of the conditions in an environment. Some sectors, without wanting to be limited to these, are intelligent video-surveillance, when the input comes from video cameras, and environmental control, when the input comes from environmental sensors, or vocal recognition.

The technical effects/advantages cited and other technical effects/advantages of the invention will emerge in further detail from the description provided herein below of an example embodiment provided by way of approximate and non-limiting example with reference to the attached drawings.

BRIEF DESCRIPTION OF THE DRAWINGS

FIG. 4 illustrates a configuration of nodes generated in the dynamic monitoring system of FIGS. 1 and 2 in a first embodiment for a first device used.

FIG. 5 illustrates a network logic applied in the embodiment of FIG. 4.

FIG. 6 illustrates a configuration of nodes generated in the dynamic monitoring system of FIGS. 1 and 2 in a first embodiment for a second device used.

FIG. 7 illustrates a network logic applied in the embodiment of FIG. 6.

FIG. 9 illustrates a configuration of nodes generated in the dynamic monitoring system of FIGS. 1 and 2 in a second embodiment for a device used.

FIG. 10 illustrates a network logic applied in the embodiment of FIG. 9.

FIG. 11 illustrates a network connecting the nodes and network logics of FIGS. 9 and 10.

FIG. 12 illustrates a configuration of nodes generated in the dynamic monitoring system of FIGS. 1 and 2 in a third embodiment for a first device used.

FIG. 13 illustrates a network logic applied in the embodiment of FIG. 12.

FIG. 14 illustrates a configuration of nodes generated in the dynamic monitoring system of FIGS. 1 and 2 in a third embodiment for a second device used.

FIG. 15 illustrates a network logic applied in the embodiment of FIG. 14.

FIG. 16 illustrates a configuration of nodes generated in the dynamic monitoring system of FIGS. 1 and 2 in a third embodiment for a third device used.

FIG. 17 illustrates a network logic applied in the embodiment of FIG. 16.

FIG. 18 illustrates a network connecting the nodes and network logics of figures from 12 to 17.

DETAILED DESCRIPTION

The invention describes a dynamic monitoring system distributable by recognition, notification and management of states of alert, which is highly scalable, constituted by dynamic nodes able to carry out computations such as for example image-recognition algorithms in the field of face recognition, number plate identification and context recognition.

The application sectors are many and based on the type of recognition system to which the dynamic monitoring system of the invention is engaged. The sectors range, therefore, from intelligent video-surveillance, when the input comes from video cameras, to environmental control, when the input comes from environmental sensors, or vocal recognition.

The functioning principle of the invention is to provide a construction logic of a recognition and alert system that is flexible due to its sub-division into parts and the organisation of its constituent and primary parts (nodes) into a flexible line.

In other words the principle is to generate a system of recognition, generation of alert and notification of significant facts which occur in a context, in other words a dynamic monitoring system, by activation of intelligent processing nodes and the creation of optimised "paths" among the nodes.

That is, starting from a group of nodes, each can be assigned with a function of the process or line of recognition, notification and management, and the mentioned group of nodes represents the final monitoring network NETWORK, configured for determining alert and notification messages. According to the invention, each node can be personalised, i.e. predisposed for a specific function with no need for a master node delegated for collation of the data managed by the various nodes; the result is a network that is highly flexible and heterogeneous.

Figure 19:
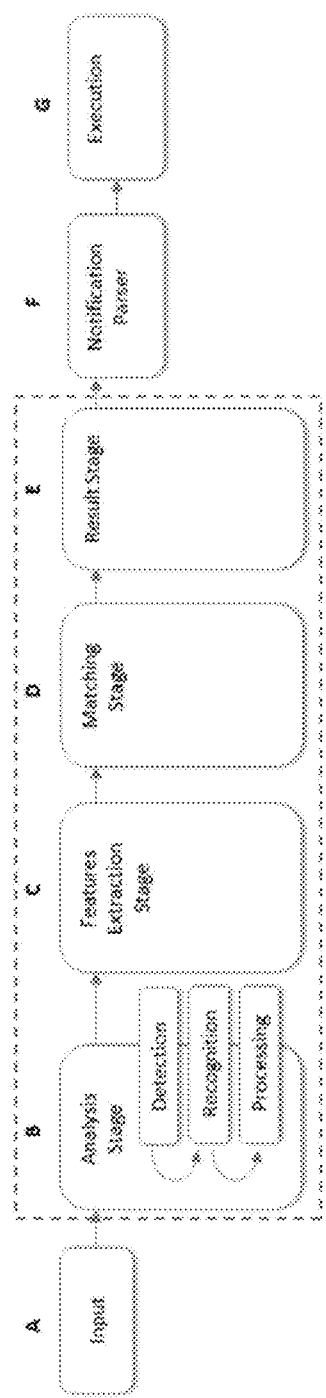
FIG. 19 shows recognition, notification and management steps.

With particular reference to FIG. 19, the recognition takes place in steps (b), (c), (d), (e), the notification in step (f) and the management in step (g). A specific instance of nodes in an alert and notification path is said logic of the monitoring network.

Thus the invention enables generating different networks which implement various logics, as described in the following.

Figure 1:
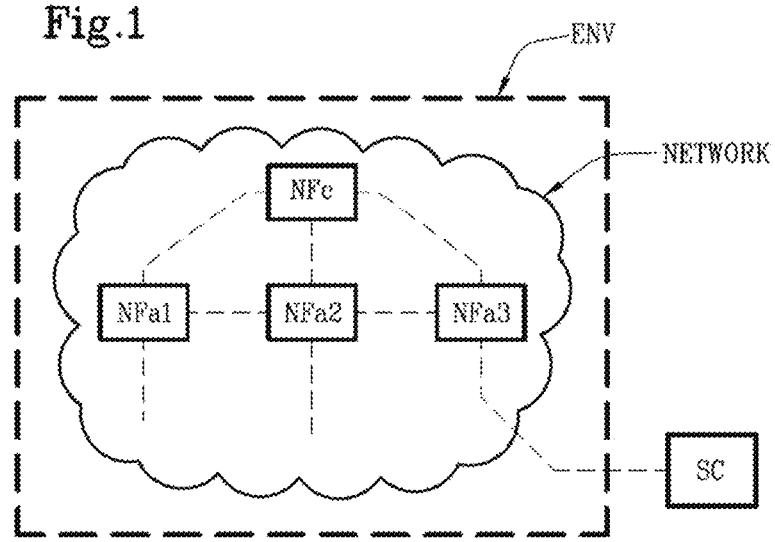
FIGS. 1 and 2 are diagrams of a dynamic monitoring system according to the present invention.
Figure 2:
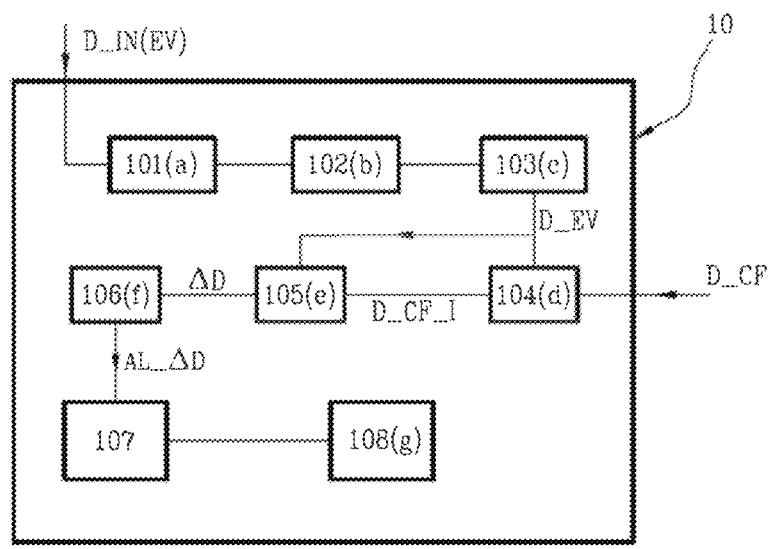

With particular reference to FIG. 1, the invention includes a dynamic monitoring of an environment.

The environment ENV preferably comprises hospitals, airports, shopping centres, data centres, prisons, schools, banks, casinos, government corporations, production and distribution plants, etc.

The invention includes predisposing a plurality of functional nodes NF. According to the invention, the functional nodes NF comprise at least a context node NFc configured for interfacing with the environment ENV to be monitored.

In other words, the at least a context node NFc is configured for collecting information and/or data relating to events to be monitored and enables interfacing with an input system.

In still other words, a context node NFc has a function of engaging the input or context in which the events take place where the context node is an intelligent node and can carry out a first processing, more or less sophisticated and calibrated flexibly.

The context node NFc is preferably configured according to one from among following types:
 a first type T1 wherein the context node NFc is configured for carrying out analysis, detecting and face recognition processes, in particular biometric;
 a second type T2 wherein said context node NFc is configured for carrying out analysis, detecting and number plate identification processes;
 a third type T3 wherein said context node NFc is configured for carrying out analysis, detecting processes and identification of removed or abandoned objects or gatherings of people.

According to the invention, the functional nodes NF further comprise one or more application nodes NFa, From the context node NFc, a network of further nodes for transmission/notification/action spreads out, specified on the basis of the type of logic network to be realised, as described in the following, and the resulting group is set up for the line of recognition and monitoring notification/network NETWORK.

The distribution criteria for the nodes includes the realising of the monitoring network NETWORK which aims at obtaining flexibility, efficiency and scalability in the development of functions on the various nodes and for different needs for carrying out the specific tasks.

The distribution criterion, therefore, makes the network highly flexible as it is not subject to predefined hierarchies.

In relation to the foregoing, the application nodes NFa in turn comprise one or more from among
 a processing application node NFa1 configured for processing data of said environment ENV to be monitored;
 a notifying application node NFa2 configured for notifying alarm situations coming from said environment ENV to be monitored to further application nodes;
 an action application node NFa3 configured for sorting alarms to a control room SC.

According to the invention, the functional nodes NF are organisable into networks NET1,NET2,NET3 realised in accordance with one or more from among following network logics L1,L2,L3:
 a first network NET1 with local logic L1;
 a second network NET2 with local logic L2;
 a third network NET3 with distributed logic L3;
The combination of one or more of said networks NET1, NET2,NET3 realises a monitoring network NETWORK according to the invention.

With reference to FIG. 19, illustrated steps from (a) to (g), which will be described in detail in the following, can be carried out by one or more context nodes NFc and by one or more application nodes NFa, organisable as a function of the network logics L1, L2 and L3 described.

Figure 3:
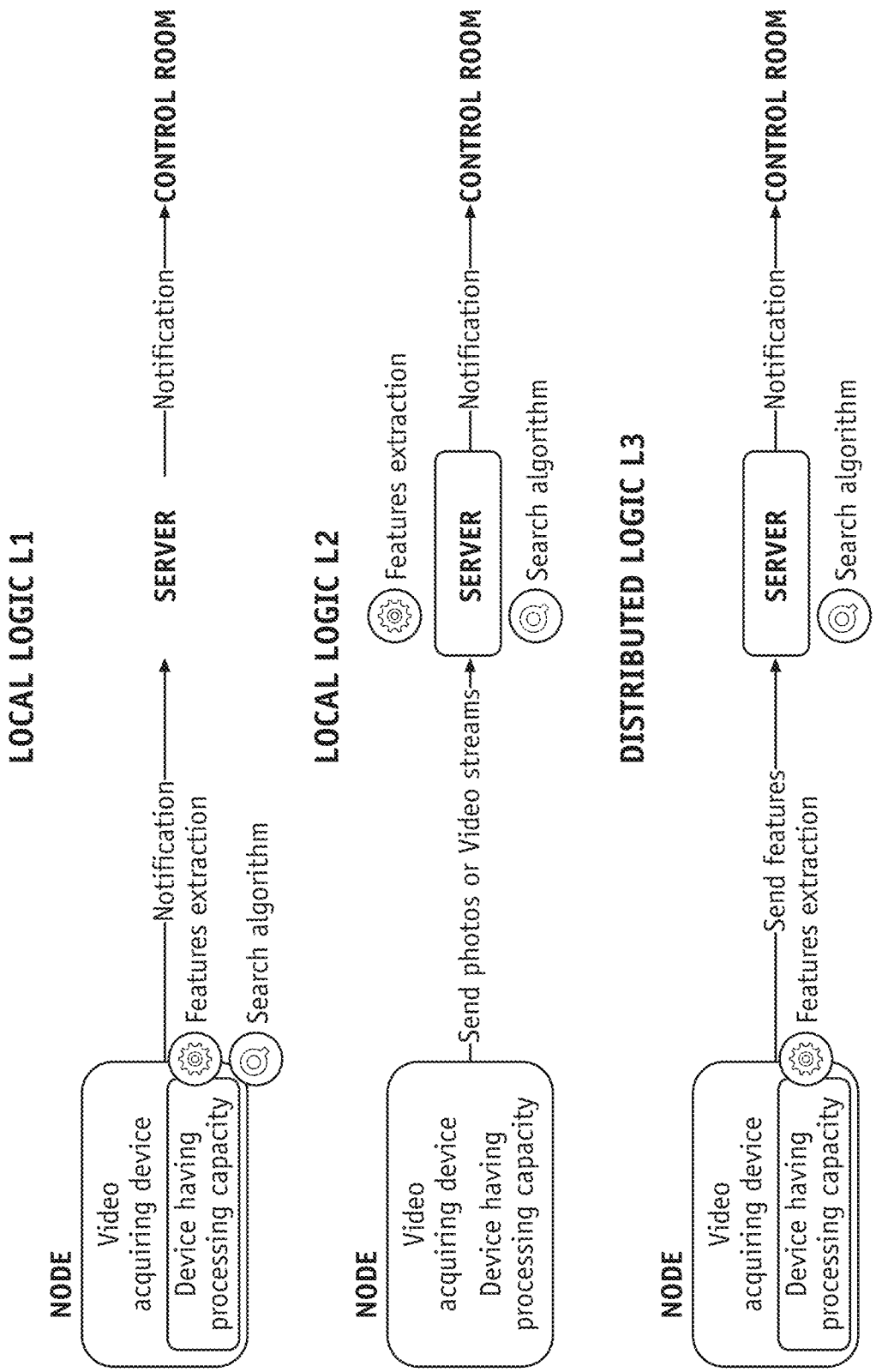
FIG. 3 is a diagram of a network logic system realised in the dynamic monitoring system according to FIGS. 1 and 2.

The described logics are illustrated in FIG. 3.

The invention comprises a plurality of steps realised by the functional nodes NF described in the foregoing according the specific functions that can be carried out.

The specific functions can be carried out in an intelligent functional node NF of the network NETWORK and, on the basis of the type of function assigned, different networks can be generated.

In detail, from among the nodes of the network NETWORK realised differently for a specific case, a path is established which leads from the input engaged by the at least a context node to the final node Nfa3 corresponding to a control room SC and where an alert and emergency management staff can perform actions.

The above will be described in more detail in the following.

The invention includes detecting the input data D_IN of the environment ENV, representing a significant event EV in the environment ENV, in which the detection is identified as step (a).

In other words, the invention comprises a processing unit 10 configured for managing the monitoring of said environment ENV among said functional nodes NF.

In general, it should be noted that in the present context and in the subsequent claims, the processing unit 10 was and will be presented as being split into distinct functional modules (storage modules or operative modules) for the sole purpose of describing its functionalities clearly and completely.

In actual fact, this processing unit 10 can comprise a single electronic device, appropriately programmed to perform the functionalities described, and the different modules can correspond to hardware entities and/or routine software that are part of the programmed device.

Alternatively, or in addition, such functions may be performed by a plurality of electronic devices over which the aforesaid functional modules can be distributed.

The processing unit 10 can also make use of one or more processors for executing the instructions contained in the storage modules.

The aforementioned functional modules can also be distributed on different local or remote computers, depending on the architecture of the network according to the invention.

According to the invention, the processing unit 10 comprises a detecting module 101 configured for detecting input data D_IN of the environment ENV representative of a significant event EV in the environment ENV.

The invention further includes analysing the input data D_IN of the environment ENV in which the analysis is identified as step (b).

In other words, the processing unit 10 comprises an analysing module 102 configured for analysing the input data D_IN of the environment ENV.

According to the invention, the steps (a) of detecting the input data D_IN of the environment ENV, representing a significant event EV in the environment ENV and (b) of analysing the input data D_IN of the environment ENV, are realised by the context node NFc.

The invention includes extracting representative data D_EV of the significant event EV as a function of said input data D_IN.

The invention further includes comparing said representative data D_EV with a group of comparative data D_CF.

In other words, the processing unit 10 comprises an extraction module 103 configured for (c) extracting representative data D_EV of said significant event EV as a function of said input data D_IN.

The processing unit 10 further comprises a comparing module 104 configured for (d) comparing the representative data D_EV with a group of comparative data D_CF.

In a first embodiment of the invention, step (c) of extracting representative data D_EV of the significant event EV as a function of the input data D_IN and step (d) of comparing the representative data D_EV with a group of comparative data D_CF are realised by the context node NFc.

In this embodiment, the group of the steps (c) and (d), as well as the steps (a) and (b) described in the foregoing, determines the monitoring network NETWORK of the environment ENV, implemented via the functional nodes NF, and realised by the context node NFc.

In this embodiment, the monitoring network NETWORK is realised as a first network NET1 with local logic L1.

In particular, a single node performs all the primary functions.

In a second embodiment of the invention, alternative to the first embodiment, step (c) of extracting representative data D_EV of the significant event EV as a function of the input data D_IN and step (d) of comparing the representative data D_EV with a group of comparative data D_CF are realised by the processing application node NFa1.

In this embodiment, the group of the steps (c) and (d), as well as the steps (a) and (b) described in the foregoing, determines the monitoring network NETWORK of the environment ENV, implemented via the functional nodes (NF), and realised starting from the context node (NFc) for arriving at one or more processing application nodes NFa1.

In this embodiment, the monitoring network NETWORK is realised as a second network NET2 with a local logic L2.

In particular, two distinct nodes, a context node NFc and a functional node NFa1, divide the functions to be carried out; the context node NFc performs the primary functions, while the processing application node NFa1 performs evolved analytical functions.

In a third embodiment of the invention, alternative to the first and the second embodiments, step (c) of extracting representative data D_EV of the significant event EV as a function of the input data D_IN is realised by the context node NFc, and step (d) of comparing the representative data D_EV with a group of comparative data D_CF is realised by the processing application node NFa1.

In this embodiment, the group of the steps (c) and (d), as well as the steps (a) and (b) described in the foregoing, determines the monitoring network NETWORK of the environment ENV, realised starting from the context node NFc for arriving at the application nodes NFa.

In this embodiment, the monitoring network NETWORK is realised as a second network NET3 with a distributed logic between the context node and the application nodes NFa.

The invention further includes (e) calculating a deviation ΔD between said representative data D_EV and the most similar comparative data D_CF.

In other words, the processing unit 10 comprises a deviation module 105 configured for (e) calculating a deviation ΔD between the representative data D_EV and the most similar comparative data D_CF.

According to the invention, steps (b) (c) (d) and (e) are carried out by the at least one context node NFc and one or more from among the application nodes NFa.

In other words, the modules configured for carrying out steps (b) (c) (d) and (e) are carried out by one from among the context node NFc or one or more from among said application nodes NFa.

The invention further includes (f) notifying by means of said notifying node NFa2 an alarm AL_ΔD as a function of said deviation ΔD detected.

The invention includes realising a monitoring network NETWORK of the environment ENV as a function of the plurality of functional nodes NF.

According to the invention, the monitoring network NETWORK of the environment ENV is topologically variable as a function of the environment ENV to be monitored, of the functions of the functional nodes NF and of said deviation ΔD detected.

In other words the monitoring network NETWORK of the environment ENV is configured for varying as a function of the environment ENV to be monitored, some functions of the functional nodes NF and of the deviation ΔD detected.

According to the invention, the monitoring of the environment ENV is realised as a function of the topology of said monitoring network NETWORK implemented.

Further, the monitoring network of the environment ENV is topologically variable as a function of the type T1,T2,T3 of the context nodes NFc.

In other words the monitoring network NETWORK of the environment ENV is configured for varying as a function of the type T1,T2,T3 of the context nodes NFc.

The invention further includes, using one or more action application nodes NFa3, previously described, receiving from the notification node NFa2 the alarm AL_ΔD as a function of the deviation ΔD detected.

In other words, the processing unit 10 comprises a receiving module 107 configured for receiving an alarm AL_ΔD from the notifying module 106, as a function of said deviation ΔD detected.

The invention further includes, by means of one or more action application nodes NFa3, (g) sorting the notification to a control room SC as a function of a sorting policy, which control room will manage the alarm that has been notified.

In other words, the processing unit 10 comprises a sorting module 108 configured for (g) sorting said alarm to a control room SC as a function of a sorting policy, which control room will manage the alarm that has been notified.

The invention further describes an environment ENV to be monitored comprising:

sending means of data to be monitored, configured for sending input data D_IN of the environment ENV representing a significant event EV in the environment (ENV)(;

a dynamic system according to the invention, in which at least a context node NFc is configured for interfacing with the environment ENV, as described in the foregoing, in which the detecting module 101 is configured for detecting the input data D_IN which will then be processed by the dynamic monitoring system.

The invention has been described in its functional and structural aspects linked to the applicable ambit of protection.

The invention will now be described in reference to three examples of embodiments:

Example 1 (FIGS. 4-8)

Experiment 1: Mobile Scenario—Face Recognition

The aim of the experiment 1 is to apply the principle of the dynamic system of the invention, described in the foregoing, on mobile devices, dedicated to recognition of faces of suspects, i.e. using at least a context node NFc of the first type T1.

The tasks to be included in the line of recognition and notification are then identified, which will have to be processed by the single functional nodes NF, with the aim of developing a precise network topology.

In the application domain of present interest, two architecture scenarios 2 will be mainly developed;

local application logic, realised as the second network NET2 with local logic L2, with the use of a tablet as the acquiring device of video flows which will delegate the business logic to a server apparatus;

distributed application logic, realised as the network NET3 with distributed logic L3, with the use of a smartphone both as an acquiring device of video flows and as a node which processes a part of the business logic.

Next is the process of Assignation of the tasks to the nodes involved:

Recognition of suspects' faces—Device 1 (tablet)=Context node NFc

In this case the network is dedicated to face recognition, developing a network with localised processing logic only in the node 2, identified as node NFa1.

The assigning of tasks to the various nodes is illustrated in FIG. 4.

The network logic applied (local logic L2) is shown in FIG. 5.

Recognition of faces of suspects—Device 2 (Smartphone)

In this case the dynamic system is dedicated to face recognition, developing a network with distributed application logic L3.

The assigning of tasks to the various nodes is illustrated in FIG. 6.

The network logic applied (distributed logic L3) is illustrated in FIG. 7.

Figure 8:
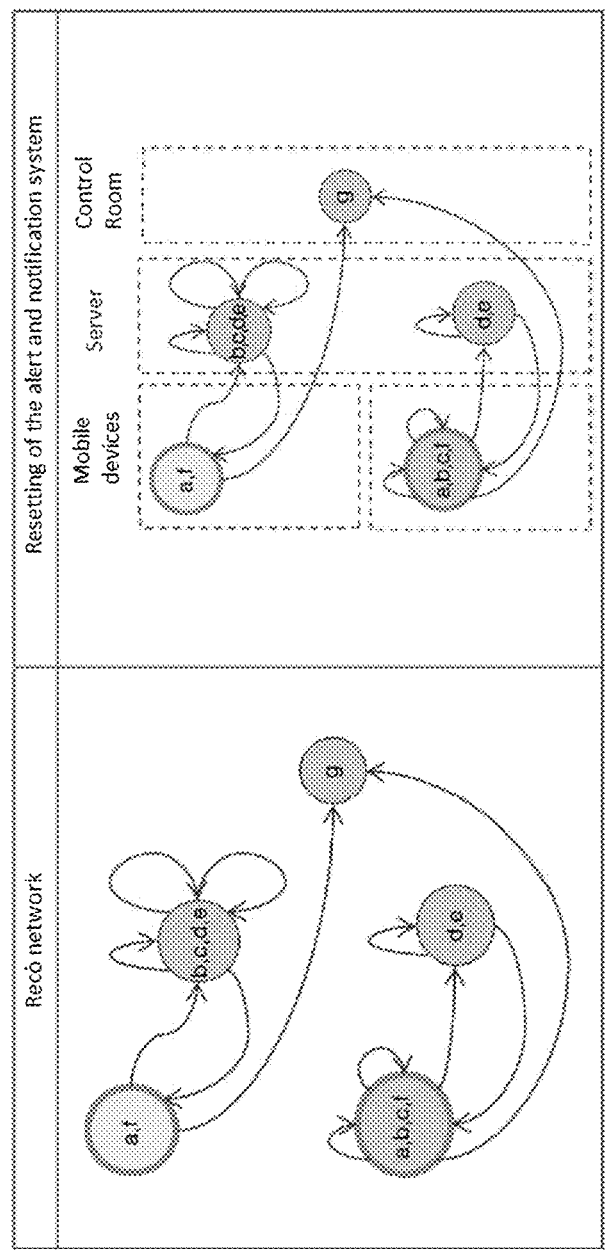
FIG. 8 illustrates a network connecting the nodes and network logics of figures from 4 to 7.

The general network NETWORK determined by the dynamic system of the invention is illustrated in FIG. 8.

The final logic of the network NETWORK is of a mixed type (local+distributed) and the distribution is represented in FIG. 8.

The distribution has been implemented on a real scenario, using two mobile devices dedicated to face recognition, representing context nodes, where, to summarise:

The Mobile device 1 implements a local application logic L2, i.e. in the real case centralized on the server, and develops by predisposing no. 1 Tablet (Context Node a) on which an application has been installed which is dedicated to the recognition of the face type (Face recognition—FR), a context node of type T1 able to acquire the image of the face to be identified by means of the camera integrated in the device.

The image is sent to the server, i.e. to the processing application node NFa1, which processes the assigned tasks, such as to the processing of the analytical process and image processing (b), extraction of the features (c), search for the pattern extracted from a set of comparative patterns (d) and calculation of the "distance" (e).

On termination of the processing of the task, the following execution of the task (f) is delegated to the mobile device 1, i.e. the context node NFc, where (f) includes management of the notifications sent by the device, and the relative notification of the alarm to the "control room" SC where, on the basis of a sorting policy for the management and taking charge of the alarm, it will be managed (task g), realised by the application node NFa3. The Mobile Device 2 implements a distributed application logic L3, and develops by predisposing no. 1 Smartphone (context node a) on which an application has been installed which is dedicated to the recognition of the facial type (FR), able to acquire the image of the face to be identified by means of the camera integrated in the device, run the analytical process and image processing (b), extract the features (c) from the acquired and normalised image and then send the features extracted to the server, i.e. to the processing application node NFa1, which runs the search process for the extracted pattern in a set of comparative patterns (d) and calculates the relative "distance" thereof (e). On termination of the processing of the task, the following carrying-out of the task (f) is re-delegated to the mobile device 1, i.e. the context node NFc, which includes the management of the notifications sent by the device, and the relative notification of the alarm to a "control room" on the basis of a sorting policy for the management and taking charge of the alarm (task g).

Example 2 (FIGS. 9-11)

Experiment 2: Gate Guarded and Equipped for Face Recognition

The aim of the experiment 2 is to apply the dynamic system of the invention, described in the preceding paragraphs, on specific devices, specially configured and installed in application contexts which enable recognition of suspects' faces from among persons who cross an access such as the gates of stations or airports, or controlled-access turnstiles.

It is assumed that the entrance is guarded by operatives.

The operatives have mobile devices (tablets) on which they receive notifications of a successful recognition of a suspect's face. The same notification of recognition is also received by operatives in a control room.

Thus the system has been configured and interfaced with input devices positioned at the access and able to collect video flows relative to the facts to be monitored.

The input devices—for example video cameras—are proximal to other intelligent nodes able to carry out one or more processes/tasks in a predefined sequence.

The following recognition scenario is thus set up, which is developed by applying the architectural principle of the invention in relation to the recognition of suspects' faces, therefore using context nodes NFc of type T1.

The scenario is constructed by identifying the tasks to be included in the line of recognition and notification, which will have to be processed by the single nodes, with the aim of developing a precise network topology.

The activity of configuration of each node corresponds to an Assignation of the node, which includes the definition of the type of tasks to be processed.

In this case the network is dedicated to face recognition, realised via the first network NET1 with local application logic L1 (FIG. 9).

Intelligent Device 1:

in the real case, the architecture having local application logic L1 is developed by predisposing no. 1 video camera (Context Node a) installed at about 2 metres, dedicated to the face-type recognition (FR) and an Embedded PC provided with computational logic able to process assigned tasks (b, c, d, e, f).

Task g is delegated to two action application nodes NFa3 which include policies of taking charge and management that are different and correspond to the operatives guarding the access and receive the notification of alarm on a tabletop computer and also the operatives of the control room who receive the notification of alarm from a remote control system and dedicated to the control room.

Example 3

Experiment 3: Intelligent Pole Equipped for 3 Types of Recognition

The aim of the experiment was to apply the dynamic system of the invention, on specific devices, specially configured and installed in contexts of application that enable recognition of suspects' faces, number plates and detection of critical context situations, therefore using context nodes NFc of the three types T1, T2, T3 described.

Thus the dynamic system has been configured and interfaced with input devices able to collect video flows relative to the facts to be monitored, where each node can carry out one or more processes/tasks in a predefined sequence.

Thus three different recognition scenarios are delineated, which will be developed by applying the architectural principle of the invention.

Recognition of faces of suspects
Number plate recognition
Detecting critical context situations For each thereof, the tasks envisaged in the line of recognition and notification are identified, which will be processed by the single nodes, with the aim of developing a precise network topology.

The activity of configuration of each node corresponds to an Assignation of the node, which includes the definition of the type of tasks to be processed.

Recognition of faces of suspects (FIG. 12-13)
In this case the network is dedicated to face recognition, with local application logic L1.
Number plate recognition (FIG. 14-15) The network which will develop will be dedicated to the recognition of number plates, implementing an application logic which includes the extraction of the OCR on the node 2, while the processing and the search by Fuzzy query is delegated to the node 3 (central Server).
Detecting critical context situations (FIG. 16-17)

The network that is developed will be dedicated to the recognition of critical context situations, implementing a local application logic L2. In the line of contextual recognition, no extraction process of the features is included, and task C, described in the foregoing, will not be taken into consideration.

The final logic is of a mixed type and the distribution is represented in FIG. 18.

The distribution has been implemented on a real scenario, predisposing no. 3 control points (Face, Plate and Context) on an intelligent pole, representing the context nodes, in which:

Intelligent Device 1 (for Recognition of Faces of Suspects)

In the real case, the architecture with local application logic L1, is developed by predisposing no. 1 video camera (Context Node a) installed at about 2 metres, dedicated to the recognition of the face (FR) and an Embedded PC provided with computational logic able to process assigned tasks (b, c, d, e).

The task (f) is delegated to the server f, which includes the management of the notifications sent by the device, and the relative notification of the alarm to a "control room" on the basis of a sorting policy for the management and taking charge of the alarm (task g).

Intelligent Device 2 (for Number Plate Recognition)

This implements a distributed application logic L3 which in the real case is developed by no. 1 video camera (Context Node a) installed at about 4 metres, dedicated to the recognition of the number plate (PR) and an Embedded PC provided with computational logic able to process assigned tasks (b, c, d) which include extraction of the features, taken here to mean OCR reading from the image/video flow that have been acquired.

The server will be delegated to the tasks e and f which respectively include the processing of the OCR extracted with the carrying out of the search (Fuzzy Query) and the sorting of the notifications to a "control room" on the basis of a sorting policy for the management and taking charge of the alarm (task g).

In this case the task named Execution g also comprises the tracking of the recognised vehicle via a search for the preceding passages and the composition of the possible paths.

Intelligent Device 3 (for Detecting Critical Situations)

This implements an local application logic 2 which is developed by predisposing no. 1 video camera (Context Node a) installed at about 4 metres, dedicated to the recognition of critical context situations (CR) and an Embedded PC provided with computational logic able to process assigned tasks (b, d, e).

In the line of contextual recognition, no extraction process of the features is included, and task C, described in the foregoing, will not be taken into consideration.

The task (f) is delegated to the server f, which includes the management of the notifications sent by the device, and the relative notification of the alarm to a "control room" on the basis of a sorting policy for the management and taking charge of the alarm (task g).

In conclusion, the invention describes a dynamic system and method of monitoring an environment.

The invention is based on the technical effects of a flexibility and ductility of the monitoring, an applicability of the detection to different conditions/environments and an efficiency of the detection, in particular in critical conditions, enabling efficient recognition, notification and management of states of alert, in particular depending on critical situations in an environment, high scalability of the operations and the detecting structure, high precision in the conditions detected, and in particular in the images detected.

Specifically, in regard to the invention, the following is proposed:

The processing unit 10 preferably comprises said detecting module 101 and said analysing module 102 implemented by said context node NFc.

Said processing unit 10 preferably comprises said extraction module 103 and said comparing module 104 implemented by said context node NFc.

The monitoring network NETWORK of said environment ENV, implemented by the functional nodes NF, is preferably realised by the context node NFc as a first network NET1 with local logic L1.

The processing unit 10 preferably comprises said extraction module 103 and said comparing module 104 implemented by said processing application node NFa1.

The monitoring network NETWORK of said environment ENV, implemented by said functional nodes NF, is preferably realised starting from said context node NFc so as to reach one or more application nodes NFa, thus realising a second network NET2 with local logic L2.

Preferably, said processing unit 10 comprises said extraction module 103 implemented by said context node NFc and said comparing module 104 implemented by said processing application node NFa1.

Said monitoring network NETWORK of said environment ENV is preferably realised starting from the context node NFc so as to reach the application nodes NFa, thus realising a network NET3 having distributed logic L3 between the context node and the application nodes NFa.

Said monitoring network NETWORK of said environment ENV is preferably topologically variable as a function of the type T1,T2,T3 of said context nodes NFc; in other words the monitoring network NETWORK of the environment ENV is configured for varying as a function of the type T1,T2,T3 of the context nodes NFc.

The invention claimed is:

1. A dynamic monitoring method of an environment, comprising steps of:
   (a) providing a plurality of functional nodes comprising:
      (a1) at least one context node configured for interfacing with the environment to be monitored;
      (a2) one or more application nodes comprising one or more nodes selected from a processing application node configured for processing data of the environment to be monitored;
         a notifying application node configured for notifying alarm situations of the environment to be monitored to further application nodes; and
         an action application node configured for sorting alarms to a control room,
   (b) detecting input data of the environment, representative of a significant event in the environment;
   (c) analysing the input data of the environment;
   (d) extracting representative data of the significant event as a function of the input data;
   (e) comparing the representative data with a group of comparative data;
   (f) calculating a deviation between the representative data and a most similar comparative data among the comparative data,
   wherein the steps (c), (d), (e) and (f) are carried out by i) one of the at least one context nodes or ii) one or more of the application nodes;
   (g) notifying by the notifying node an alarm as a function of the deviation; and
   (h) implementing a monitoring network of the environment as a function of the plurality of functional nodes,
   wherein the monitoring network is topologically variable as a function of the environment to be monitored, functions of the functional nodes and of the deviation, and
   wherein the monitoring of the environment is performed as a function of the topology of the monitoring network implemented.

2. The dynamic monitoring method according to claim 1, comprising steps, performed by the action application nodes, of:
   receiving an alarm from the notifying application node, as a function of the deviation; and
   sorting the notification to a control room as a function of a sorting policy, the control room configured to manage the alarm that has been notified.

3. The dynamic monitoring method according to claim 1, wherein the plurality of functional nodes are organizable into networks implemented according to one or more network logics selected from:
   a first network with local logic;
   a second network with local logic; and
   a network with distributed logic,
   wherein a combination of one or more of the network logics implements the monitoring network.

4. The dynamic monitoring method according to claim 1, wherein the steps (b) and (c) are performed by the at least one context node.

5. The dynamic monitoring method according to claim 4, wherein the steps (d) and (e) are performed by the at least one context node.

6. The dynamic monitoring method according to claim 5, wherein the monitoring network of the environment implemented by the plurality of functional nodes is performed by the at least one context node as a first network with local logic.

7. The dynamic monitoring method according to claim 4, wherein the steps (d) and (e) are performed by the processing application node.

8. The dynamic monitoring method according to claim 7, wherein the monitoring network of the environment starts from the at least one context node to reach the one or more application nodes, implementing a second network with central logic.

9. The dynamic monitoring method according to claim 4, wherein the step (d) is performed by the at least one context node, and the step (e) is carried out by the processing application node.

10. The dynamic monitoring method according to claim 9, wherein the monitoring network of the environment starts from the at least one context node to reach the one or more application nodes, implementing a network having distributed logic between the at least one context node and the one or more application nodes.

11. The dynamic monitoring method of claim 1, wherein the monitoring network of the environment is topologically variable as a function of context node type.

12. The dynamic monitoring method according to claim 1, wherein the method is a computer-implemented method.

13. The dynamic monitoring method according to claim 1, wherein the at least one context node is configured according to a context node type selected from:

a first type wherein the context node is configured to perform analysis, detection and facial recognition processes;

a second type wherein the context node is configured to perform analysis, detection and number plate identification processes; and a third type wherein the context node is configured to perform analysis, detection, and identification of removed or abandoned objects or gatherings of people processes.

14. A dynamic monitoring system of an environment, comprising (i) a context node configured for interfacing with the environment to be monitored;

(ii) one or more application nodes comprising one or more nodes selected from:

a processing application node configured for processing data of the environment to be monitored;

a notifying application node configured for notifying alarm situations in the environment to be monitored to further application nodes; and an action application node configured for sorting alarms to a control room, (iii) a processing unit configured for managing the monitoring of the environment among the functional nodes, wherein the processing unit comprises:

(iii-1) a detecting module configured for detecting input data of the environment, representative of a significant event in the environment;

(iii-2) an analysing module configured for analysing the input data of the environment;

(iii-3) an extraction module configured for extracting representative data of the significant event as a function of the input data;

(iii-4) a comparing module configured for comparing the representative data with a group of comparative data;

(iii-5) a deviation module configured for calculating a deviation between the representative data and a most similar comparative data among the comparative data; and (iii-6) a notifying module configured for notifying an alarm as a function of the deviation detected using the notifying node, wherein the modules (iii-1), (iii-2), (iii-3), (iii-4), (iii-5) and (iii-6) are carried out by one of i) the context node or ii) the one or more application nodes, implementing a monitoring network of the environment;

wherein the monitoring network of the environment is topologically variable as a function of the environment to be monitored, functions of the functional nodes and the deviation; and wherein the processing unit is configured for managing the monitoring of the environment, as a function of the topology of the monitoring network.

15. The dynamic monitoring system according to claim 14, wherein the processing unit further comprises:

(iii-7) a receiving module configured for receiving an alarm from the notifying module, as a function of the deviation detected; and (iii-8) a sorting module configured for sorting the alarm to a control room as a function of a sorting policy, the control room configured to manage the alarm that has been notified.

16. The dynamic monitoring system according to claim 14, wherein the functional nodes are organizable into networks implemented in accordance with one or more network logics selected from:

a first network with local logic;

a second network with central logic; and a network with distributed logic, wherein a combination of the one or more network logics implements the monitoring network.

17. The dynamic monitoring system according to claim 14, wherein the context node is configured according to a context node type selected from:

a first type wherein the context node is configured to perform analysis, detection and facial recognition processes;

a second type wherein the context node is configured to perform analysis, detection and number plate identification processes; and a third type wherein the context node is configured to perform analysis, detection, and identification of removed or abandoned objects or gatherings of people processes.

18. An environment to be monitored comprising:

means for sending data to be monitored, configured for sending input data of the environment, representing a significant event in the environment; and the dynamic monitoring system according to claim 14, wherein the detecting module is configured for detecting the input data.

* * * * *